United States Patent [19]

Sietz

[11] 4,166,823

[45] Sep. 4, 1979

[54] PROCESS FOR PURIFYING PHOSPHATIDES

[75] Inventor: Fritz G. Sietz, Zwijndrecht, Netherlands

[73] Assignee: Thomas J. Lipton, Inc., Englewood Cliffs, N.J.

[21] Appl. No.: 788,238

[22] Filed: Apr. 18, 1977

Related U.S. Application Data

[63] Continuation-in-part of Ser. No. 716,101, Aug. 20, 1976, abandoned, which is a continuation of Ser. No. 559,231, Mar. 17, 1975, abandoned.

[30] Foreign Application Priority Data

Mar. 22, 1974 [GB] United Kingdom ............... 12927/74

[51] Int. Cl.$^2$ ........................... A23J 7/00; C07F 9/02; C11C 3/00
[52] U.S. Cl. ................................ 260/403; 260/428.5; 426/430; 426/662
[58] Field of Search ........................... 260/403, 428.5; 426/662, 429, 430

[56] References Cited

U.S. PATENT DOCUMENTS

| 2,182,767 | 12/1939 | Thurman | 260/403 |
| 2,201,064 | 5/1940 | Thurman | 260/403 X |
| 2,727,046 | 12/1955 | Scholfield | 260/403 |
| 3,652,397 | 3/1972 | Pardun | 260/403 X |

FOREIGN PATENT DOCUMENTS

| 925374 | 7/1949 | Fed. Rep. of Germany | 260/403 |
| 933814 | 8/1963 | United Kingdom | 260/403 X |

Primary Examiner—John Niebling
Attorney, Agent, or Firm—Brumbaugh, Graves, Donohue & Raymond

[57] ABSTRACT

A process for purifying phosphatides to obtain transparent phosphatides wherein crude phosphatides are subjected to the combined action of a hydrophobic liquid and water is described. The two liquids are separated and the purified phosphatide product is recovered from the hydrophobic liquid. In this way, a transparent phosphatide product is obtained.

9 Claims, No Drawings

PROCESS FOR PURIFYING PHOSPHATIDES

This application is a continuation-in-part application of the copending application Ser. No. 716,101 filed Aug. 20, 1976 which in turn was a continuation application of Ser. No. 559,231 filed Mar. 17, 1975, both now abandoned.

In a preferred embodiment, hexane is added to a non-dried crude phosphatide sludge obtained by the water desliming of a crude oil and the amount of volume of the hexane is about twice that of the sludge.

The invention relates to a process for purifying phosphatides and the transparent phosphatide product obtained by said process.

Conventionally, phosphatides are obtained from beans, in particular soya beans and other phosphatide-containing materials. In the processing of beans, the phosphatides are, for instance, obtained by pressing or solvent extraction of the beans and by separating the phosphatides from the resulting crude oils by a treatment with water or aqueous solutions.

The aqueous sludge obtained contains phospholipids, a certain proportion of oil, fatty acids, carbohydrates, proteins, mineral salts, sterols, some remainders of the bean shells and occasionally other materials. The sludge may be dried to obtain a yellow to black mass with a wax-like consistency. The phosphatides may be subjected to various treatments such as removal of the oil, replacement of the oil by another oil, hydroxylation and hydrolysis, either by enzymatic action or by acidic or alkaline hydrolysis.

Until now, however, it has been very difficult to remove from the phosphatides some of the materials which render them less suitable for certain application. U.S. Pat. No. 2,201,064 describes a purification process in which dried phosphatides are dissolved in hexane. Belgian Pat. No. 590,731 describes a purification process in which dried crude phosphatides are treated with e.g. hexane and e.g. acetone which may contain up to 10% of water. These prior art processes do not yield a transparent phosphatide product.

It has now been found that a purified transparent phosphatide product is obtained when phosphatides are subjected to the combined action of a hydrophobic liquid and water. The two liquids are separated and the purified phosphatide product is recovered from the hydrophobic liquid. According to the process of the invention a transparent phosphatide product is obtained.

The process of the invention produces a purified phosphatide product which is transparent. Moreover, much of the disagreeable off-flavor normally associated especially with conventional hydrolysed phosphatides appears to have been removed during the purification treatment.

The hydrophobic liquid to be used in accordance with the present invention may be any hydrophobic liquid in which phosphatides are soluble. Examples are aliphatic, preferably saturated hydrocarbons, preferably alkanes such as heptane, hexane and pentane. Cyclic alkanes such as cyclohexane are also suitable. Aromatic compounds such as benzene may also be used. Hexane is preferred.

The presence of substantial amounts of polar organic liquids tend to make the subsequent separation of hydrophobic liquid and water more difficult. Moreover, it has been found that polar organic liquids cause the recovery of the phosphatide product from the hydrophobic liquid to be more troublesome and affect the quality of the product adversely.

One preference is the presence in the water layer of a minor amount of a bleaching agent. A suitable agent is $H_2O_2$. Suitable quantities are 0.5–5%, preferably 0.5–2% by weight, based on the water.

The term "phosphatides" as used herein denotes a mixture of phospholipids and other materials (other than water) comprising non-lipid materials as is, for instance, obtained in the aqueous sludge described above, possibly after one or more of the treatments also described above. Such products are also often referred to as "lecithin".

The amount of water to be used in accordance with the process of the invention is preferably between 5 and 150% by volume of the phosphatides, more preferably between 50 and 100%.

The amount of hydrophobic liquid to be used in the process of the invention is preferably between 200 and 2000% by volume of the phosphatides, more preferably between 400 and 600%.

The process is preferably carried out while the amount (by volume) of hydrophobic liquid is about 1 to about 3 times, preferably about twice, as large as the amount (by volume) of phosphatides plus water. The sequence in which the two liquids are added to the phosphatides is immaterial. In a preferred embodiment, the hydrophobic liquid is added to the aqueous sludge described above containing the phosphatides, optionally after some other treatment like, for instance, hydrolysis of the phospholipids. This procedure has the advantage that the need for an intermediate drying step is obviated.

The manner in which the two liquids are separated is not essential. Centrifuging is preferred.

Recovery of the purified phosphatide product from the hydrophobic liquid is preferably by evaporation.

The temperature and pressure at which the process is carried out can vary within wide limits. Atmospheric pressure at ambient temperature is preferred.

The purified phosphatide product obtained is transparent and superior to the untreated one with respect to odor, taste and oil-solubility. The product can especially usefully be applied in food preparations like margarine. Still another advantage of the purified phosphatide product according to the invention is its good oil solubility as compared with conventional products.

The advantage of the process according to the invention are especially pronounced when the process is applied to phosphatides which have been hydrolysed by pancreatin.

The invention is illustrated by the following examples.

EXAMPLE I 100 kg crude soybean phosphatide sludge containing 33% of water were homogenized with 200 l hexane and centrifuged. The transparent hexane phase emerging from the centrifuge was evaporated in two stages, in the first stage in a vertical evaporator, in the second stage in a thin film evaporator. As compared with the phosphatides recovered in the conventional way, i.e. by drying of the sludge, the phosphatide obtained showed the following properties.

| | | conventional process | process of the invention |
|---|---|---|---|
| Acetone-insoluble matter (1) | % | 63 | 63 |
| Moisture (2) | % | 0.5 | < 0.05 |
| Color/Gardner (3) | % | 10 | 10 |
| Color/Iodine (4) | | 20 | 18 |
| Color/Lovibond (5) | | 35 g + 3.6 r + 0.6 b | 35 + 3.2 |
| Sugar (calc. on saccharose) (6) | % | 3.5 | 1.5 |
| Transparency (7) | % | 12.8 | 84.5 |
| Acid Value (8) | | 23 | 23 |
| Phosphorus (9) | % | 1.93 | 2.0 |
| Iron (10) | ppm | 152 | 73 |
| Composition with 20% oil | | settles | does not settle |

(1) Acetone-insoluble matter determined according to the Official and Tentative Methods of the American Oil Chemists' Society.
(2) Modified Karl Fischer Method according to the Official and Tentative Methods of the American Oil Chemists' Society.
(3) Official and Tentative Methods of the A.O.C.S.
(4) Methods of the Deutsche Gesellschaft für Fettwissenschaft, Münster/Westf.
(5) Methods of the A.O.C.S.
(6) Methods of the A.O.C.S.
(7) Transparency was determined as follows:
The material is heated to 50° C. in a waterbath. It is then dissolved with stirring in equal parts by weight of xylol.
Turbidity of the solution is measured in a turbidity measuring unit sold by B. Lange GmbH, Berlin, Germany.
The transparency of the solution is $T_v = 100 - t$, wherein t is the measured turbidity.
The extinction of the solution is $E_v = \log 1/T$.
The transparency of the material is then calculated from the formula $E_v \cdot 2 = \log 1/T$
Methods of the A.O.C.S.
(9) Methods of the A.O.C.S.
(10) Methods of the Deutsche Gesellschaft für Fettwissenschaft, Münster/Westf.

EXAMPLE II 100 kg of crude soybean phosphatide sludge containing 55% of water were treated as described in Example I. The loss of sludge, calculated on the dry matter, amounted to about 9.5% analytical results:

| | | conventional process | process of the invention |
|---|---|---|---|
| Acetone-insoluble matter | % | 67 | 67 |
| Moisture | % | 0.6 | < 0.05 |
| Color/Iodine | | 24 | 22 |
| Sugar | % | 3.2 | 1.7 |
| Transparency | % | 10 | 88 |
| Acid Value | | 18 | 18 |
| Phosphorus | % | 1.96 | 2.04 |
| Iron | ppm | 280 | 135 |
| Composition with 20% oil | | settles | does not settle |

EXAMPLE III 10 kg of crude soybean phosphatides were homogenized with 10 l water. The sludge was then homogenized with 40 l cyclohexane and the mixture was centrifuged. The white solvent phase was evaporated. The phosphatides thus obtained were transparent. Analysis showed that the sugar content decreased to about 40% and the iron content to about 55% of the starting value. The P-content had risen by 0.04%. Color, acetone-insoluble matter and acid value had remained substantially constant.

EXAMPLE IV 10 kg crude soybean phosphatides were dissolved in 40 l hexane. Subsequently 10 l water was stirred into the solution. After 10 min stirring the solution was allowed to settle. After a resting period of 5 h and separation of the phases the hexane solution was evaporated. The phosphatides thus obtained were transparent. The analytical data corresponded to those of the preceding examples.

EXAMPLE V 10 kg crude phosphatide sludge, which has been hydrolysed enzymatically according to the U.S. Pat. No. 3,652,397, were homogenized with 20 l hexane and centrifuged. The hydrolysed phosphatides isolated from the hexane phase were transparent. The sugar and iron contents had been reduced to about half the starting values.

The P-value had increased by 0.05%. The other values (color, acetone-insoluble matter, acid value) had remained constant.

I claim:

1. A process for obtaining transparent phosphatides from crude phosphatide sludge comprising (a) subjecting said sludge prior to alkali refining to the action of a combination of solvents consisting essentially of (i) a hydrophobic liquid solvent selected from the group consisting of aliphatic, cyclic and aromatic hydrocarbons in an amount of between about 200% and 2000% by volume and (ii) water in an amount of between about 5% and 150% by volume, both (i) and (ii) amounts being based on the volume of the phosphatide content of said sludge, (b) separating the hydrophibic liquid and the water, and (c) recovering the transparent phosphatide product from the hydrophobic liquid.

2. The process according to claim 1 wherein the hydrophobic liquid is a saturated aliphatic hydrocarbon.

3. The process according to claim 2 wherein the hydrophobic liquid is hexane.

4. The process according to claim 1 wherein the amount of the hydrophobic liquid is between about 400% and 600% by volume and the amount of water is between about 50% and 100% by volume, both amounts being based on the volume of the phosphatide.

5. The process according to claim 1 wherein the volume of the hydrophobic liquid is between about 1 and 3 times the volume of the phosphatide plus water.

6. A process for obtaining transparent phosphatides from crude phosphatide sludge comprising (a) admixing (i) a crude phosphatide sludge obtained by desliming a crude oil prior to alkali refining with a solvent consisting essentially of water, and without drying the sludge, with (ii) a hydrophobic liquid solvent selected from the group consisting of aliphatic, cyclic and aromatic hydrocarbons in an amount of about 1 to 3 times the volume of the sludge, (b) thoroughly mixing the hydrophobic liquid solvent with the sludge, (c) separating the mixture obtained into an aqueous phase and a hydrophobic liquid phase, (d) and recovering the transparent phosphatide product from the hydrophobic liquid phase.

7. The process according to claim 6 wherein the volume of the hydrophobic liquid is about twice the volume of the crude phosphatide sludge.

8. The process according to claim 6 wherein the hydrophobic phase and the aqueous phase are separated by centrifugation.

9. The process according to claim 6 wherein the purified phosphatide product is recovered from the hydrophobic liquid by evaporation of said liquid.

* * * * *